United States Patent
Hill et al.

(10) Patent No.: US 9,933,322 B2
(45) Date of Patent: Apr. 3, 2018

(54) DEVICE AND METHOD FOR SPATIALLY RESOLVED MEASUREMENT OF TEMPERATURE STRAIN, OR BOTH BY BRILLOUIN SCATTERING

(71) Applicant: LIOS Technology GmbH, Cologne (DE)

(72) Inventors: Wieland Hill, Odenthal (DE); Alexander Rath, Huertgenwald (DE); Benjamin Marx, Cologne (DE)

(73) Assignee: LIOS TECHNOLOGY GMBH, Cologne (DE)

( * ) Notice: Subject to any disclaimer, the term of this patent is extended or adjusted under 35 U.S.C. 154(b) by 0 days.

(21) Appl. No.: 15/232,393

(22) Filed: Aug. 9, 2016

(65) Prior Publication Data
US 2017/0059428 A1    Mar. 2, 2017

(30) Foreign Application Priority Data
Sep. 2, 2015 (DE) .......... 10 2015 114 670

(51) Int. Cl.
*G01B 11/16* (2006.01)
*G01L 1/24* (2006.01)
(Continued)

(52) U.S. Cl.
CPC .......... *G01L 1/242* (2013.01); *G01D 5/35364* (2013.01); *G01K 11/32* (2013.01); *G02B 6/2773* (2013.01); *G01K 2011/322* (2013.01)

(58) Field of Classification Search
CPC .......... G01B 9/02; G01K 11/32; G01L 1/242; G02B 6/2773; G01D 5/35364; G01H 9/00
(Continued)

(56) References Cited

U.S. PATENT DOCUMENTS 4,761,073 A * 8/1988 Meltz .................. G01B 11/16
250/227.18
5,991,479 A * 11/1999 Kleinerman .......... G01J 5/08
250/227.11
(Continued)

FOREIGN PATENT DOCUMENTS

CN       102980681 A    3/2013
DE    102007059551 A1   7/2008
(Continued)

OTHER PUBLICATIONS

German Search Report of 10 2015 114 670.3, dated May 11, 2016.
Fan, Hanbai et al., Brillouin-based distributed temperature and strain sensor using Landau-Placzek Ratio, Material and DeviceTechnology for Sensors; Bejing, China, Jun. 17, 2009. vol. 7381, 2009 pp. 738105-1-1738105-9.
(Continued)

*Primary Examiner* — Harshad R Patel
*Assistant Examiner* — Octavia Hollington
(74) *Attorney, Agent, or Firm* — Cohen & Hildebrand, PLLC

(57) ABSTRACT

Device for spatially resolved measurement of temperature, strain, or both by Brillouin scattering, with a laser light source (1) for generating a laser radiation, an optical fiber (5) used for the measurement, into which the laser radiation can be coupled in and from which Brillouin signals generated by Brillouin scattering can be coupled out, sensors for detecting the coupled-out Brillouin signals, evaluators for determining spatially resolved from the detected Brillouin signals the temperature, strain, or both of sections of the optical fiber (5), a polarization beam splitter (10, 11) capable of splitting the coupled-out Brillouin—signals into two components (12, 13) having mutually different polarizations, and an optical coupler (16, 17) for admixing a laser radiation to the Brillouin signal.

16 Claims, 3 Drawing Sheets

(51) Int. Cl.
  *G01D 5/353* (2006.01)
  *G01K 11/32* (2006.01)
  *G02B 6/27* (2006.01)

(58) Field of Classification Search
  USPC .......................................................... 73/800
  See application file for complete search history.

(56) References Cited

U.S. PATENT DOCUMENTS

| | | | |
|---|---|---|---|
| 7,283,216 | B1 | 10/2007 | Geng et al. |
| 7,859,654 | B2* | 12/2010 | Hartog ............... G01M 11/3127 356/73.1 |
| 9,157,810 | B2* | 10/2015 | Hill ........................ G01K 11/32 |
| 9,252,559 | B2* | 2/2016 | Narayanan ........... G01C 19/721 |
| 9,410,826 | B2* | 8/2016 | Bastianini .......... G01D 5/35364 |
| 2008/0002187 | A1 | 1/2008 | Frogatt |
| 2008/0084914 | A1 | 4/2008 | Yamamoto et al. |
| 2012/0174677 | A1 | 7/2012 | Hill |
| 2012/0281201 | A1 | 11/2012 | Brown |

FOREIGN PATENT DOCUMENTS

| | | |
|---|---|---|
| DE | 102008019150 B4 | 7/2010 |
| DE | 102009043546 A1 | 3/2011 |
| EP | 2110651 A1 | 10/2009 |
| JP | S6486032 A | 3/1989 |
| JP | H05172657 A | 7/1993 |
| JP | 2012063146 A | 3/2012 |
| RU | 2248540 C1 | 3/2005 |
| WO | 2011022829 A1 | 3/2011 |
| WO | 2013108063 A1 | 7/2013 |
| WO | 2014149229 A1 | 9/2014 |

OTHER PUBLICATIONS

Galindez-Jamioy, C.A. et al. , Brillouin Distributed Fiber Sensors: An Overview and Applications, Journal of Sensor. 2013 vol. 2012 pp. 204121-1-204121-17.
Inaudi, Daniele, GLISC, Branko: Reliability and field testing distributed strain and temperature sensors; San Diego, CA, Feb. 26, 2006; vol. 6167, 2006, pp. 6167 D-1-6167 D-8.
Liu, X. et al, Brillouin spectrum in LEAF and simultaneous temperature and strain measurement, IEEE/OSA Journal of Lightwave Technology (J-LT). vol. 30, Book 8,pp. 1053-1059.
Maughan, S.M. et al., Simultaneous distributed fibre temperature and strain sensor using microwave coherent detection of spontaneous brillouin backscatter. Measurement Science andf Technology. 2001, vol. 12, Book 7, pp. 834-842.
Parker, T.R. et al. Temperature and strain dependence of the power level and frequency of spontaneous Brillouin scattering in optical fibers. Optics Letters 1997 vol. 22, book 11, pp. 787-789.
Shimizu et al. Coherent self-heterodyne brillouin OTDR for measurement of brillouin frequency shift Distribution in optical fibers. IEEE/OSA Journal of Lightwave Technology, 1994, vol. 12, book 5, pp. 730-736.
Song, M. et al. Optical coherent detection Brillouin distributed optical fiber sensor based on orthogonal polarization diversity reception. Chinese Optics Letters. 2005, vol. 3, book 5, pp. 271-274.
Wait,P.C. et al. Landau Placzek ratio applied to distributed fibre sensing. Optics Communications. 1996. vol. 122 book 4-6, pp. 141-146.
Weng, Y. Single-end simultaneous temperature and strain sensing techniques based on Brillouin optical time domain reflectometry in few-mode fibers. Optics Express. 2015 vol. 23, book 7, pp. 9024-9039.

* cited by examiner

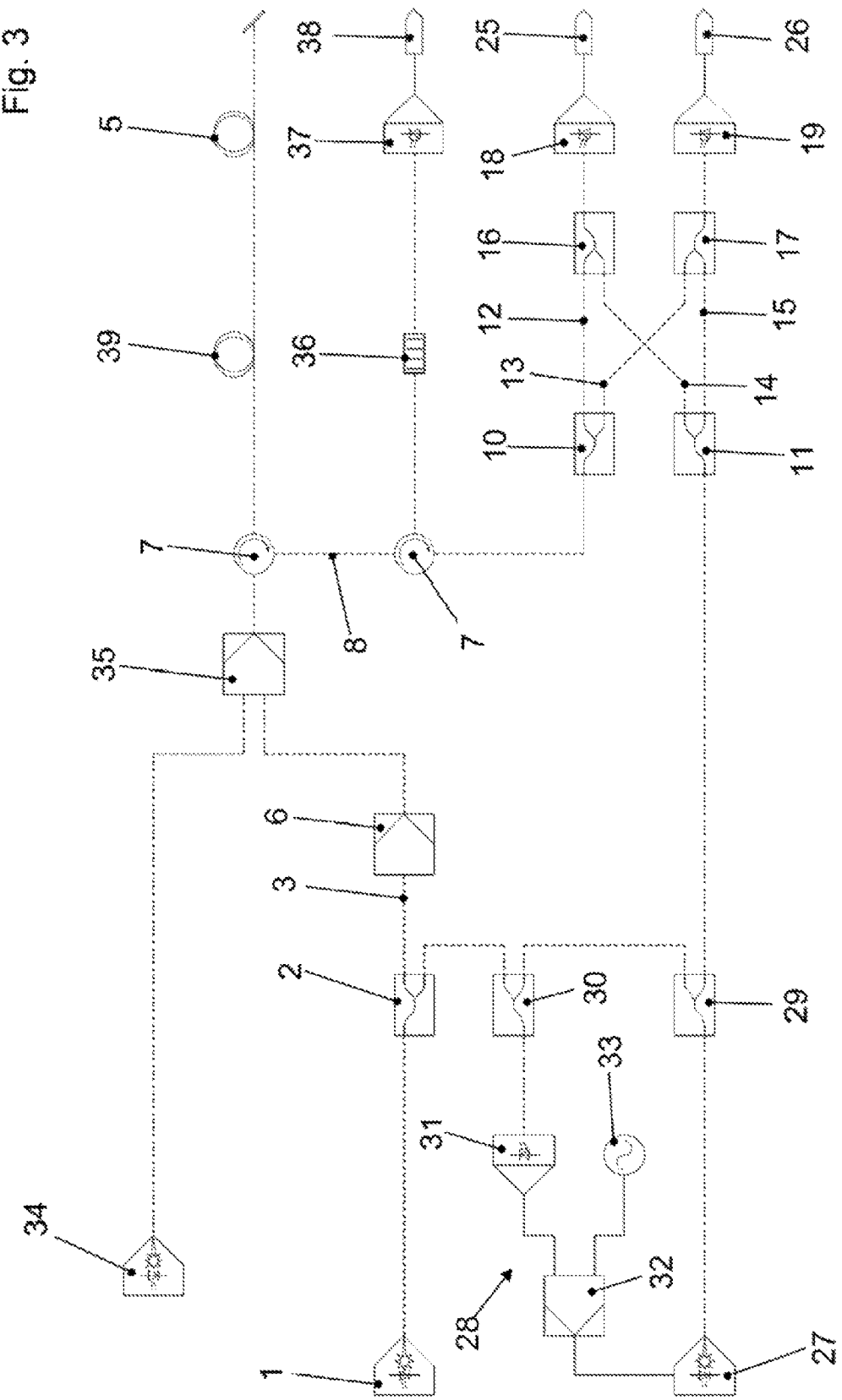

DEVICE AND METHOD FOR SPATIALLY RESOLVED MEASUREMENT OF TEMPERATURE STRAIN, OR BOTH BY BRILLOUIN SCATTERING

This is an application claiming priority to DE 10 2015 114 670.3 filed on Sep. 2, 2015, which is incorporated by reference.

BACKGROUND OF THE INVENTION

The present invention relates to a device and a method for spatially resolved measurement of temperature and/or strain by Brillouin scattering.

Brillouin scattering in optical fibers can be used for a distributed or spatially resolved measurement of temperature and strain along the optical fiber, because the frequency and the amplitude of the Brillouin scattering are a function of the measurement parameters temperature and strain (see: Galindez-Jamioy & López-Higuera, 2012 Brillouin Distributed Fiber Sensors: An Overview and Applications. 2012, 17).

Frequently, only the Brillouin frequency is measured, which depends very profoundly on the measurement parameters, for example, with about 1 MHz/° C. or 0.05 MHz/µε in quartz glass and which can be determined very accurately. However, separating the influence of both measurement parameters is problematic.

The two measurement parameters can be separated in some situations by comparative measurements on differently installed optical fibers, for example loose tubes with a loose fiber or a tight tube with a fixed fiber (see: Inaudi & Glisic, 2006 Reliability and field testing of distributed strain and temperature sensors 6167, 61671D-61671D-8). Alternatively, measurements of the Brillouin frequencies either in fibers with multiple Brillouin peaks (see: Liu & Bao, 2012 Brillouin Spectrum in LEAF and Simultaneous Temperature and Strain Measurement Lightwave Technol., 30 (8), 1053-1059) or in oligo-mode fibers with few different spatial modes (see: Weng, Ip, Pan, & Wang, 2015, Single-end simultaneous temperature and strain sensing techniques based on Brillouin optical time domain reflectometry in few-mode fibers, Opt. Express, 23 (7), 9024-9039) with different dependencies of the frequency on temperature and strain can be used to separate the measurement parameters.

However, all these methods cannot be widely used, because suitable optical fibers are not always available for the application. Furthermore, the installation and measurement of several optical fibers or of special fibers is associated with higher expenses.

Another method for separating the two measurement parameters is the measurement of frequency and amplitude of one or more Brillouin peaks (see: Parker, Farhadiroushan, Handerek, & Rogers, 1997, Temperature and strain dependence of the power level and frequency of spontaneous Brillouin scattering in optical fibers, Opt Lett., 22 (11), 787-789, and Maughan,. Kee & Newson, 2001, Simultaneous distributed fiber temperature and strain sensor using microwave coherent detection of spontaneous Brillouin backscatter, Measurement. Science and Technology, 12 (7), 834). In this way, two independent measurement parameters are obtained, from which both these physical parameters are can determined in principle. However, the dependence of the amplitude on the temperature and strain is weak and amounts, for example, to approximately 0.3%/° C. Therefore, the amplitude must be measured very precisely to achieve practically relevant temperature resolutions and accuracies of about 1° C.

A known method for improving the accuracy is to compare the Brillouin amplitude with the amplitude of Rayleigh scattering from the same fiber (see: Wait & Newson, 1996, Landau Placzek ratio applied to distributed fiber sensing, Optics Communications, 122, 141-146). The influence of fiber attenuation can be eliminated by calculating the ratio of the Brillouin amplitude to the Rayleigh amplitude, which is referred to as Landau Placzek ratio.

Usually, the Brillouin signal is not measured simply with an optical filter and a photodiode, because the required very narrow-band optical filters are difficult to produce and are thermally not very stable. Moreover, the alternative measurement of the Brillouin scattering can measure lower signal strengths with an optical heterodyne receiver (see: Maughan, Kee, & Newson, 2001). Brillouin scattering signal is hereby superimposed with laser light having the same frequency as the laser exciting the Brillouin scattering or a frequency shifted by several GHz (local oscillator LO). The photodetector then detects a superimposed signal with a frequency that corresponds to the difference between the Brillouin frequency and the laser frequency or LO frequency, respectively. When mixed with the exciting laser, the difference frequency for quartz glass is about 10 GHz, This signal is typically GHz mixed with an electronic local oscillator in order to obtain a better measurable difference frequency below 1 GHz (Shimizu, Horiguchi, Koyamada & Kurashima, 1994, Coherent self-heterodyne Brillouin OTDR for measurement of Brillouin frequency shift distribution in optical fibers, Lightwave Technology, Journal of, 12 (5), 730-736).

However, in addition to the fiber attenuation, there is the additional problem caused by the polarization dependence of the measured signal. This problem interferes with the accuracy of the measurement of both parameters, namely frequency and amplitude. When the Brillouin signal is superposed with an optical local oscillator, only the signal component that matches the polarization of the local oscillator is admixed to the difference frequency. The signal with another polarization is then lost for the measurement. In addition, the polarization of the Brillouin signal during transmission through the optical fiber changes due to the stress-induced birefringence in the optical fiber. This means that the amplitude of the measured polarization component of the Brillouin signal varies strongly as a function of the distance. This polarization dependence thus makes an accurate amplitude determination considerably more difficult and also degrades the accuracy of the frequency determination. Until now, attempts were made to compensate for this effect by averaging over measurements with different polarization of the exciting laser or local oscillator (see: Fan, Huang, & Li, 2009, Brillouin-based distributed temperature and strain sensor using the Landau-Placzek Ratio, 7381,738105-738105-9 and Song, Zhao, & Zhang, 2005, Optical coherent detection Brillouin distributed optical fiber sensor based on orthogonal polarization diversity reception, Chin. Opt. Lett., 3 (5), 271-274). However, a large number of averages are required for a reasonably accurate measurement, without having solved the problem of signal loss.

The problem forming the basis of the present invention is therefore to provide a device and a method of the aforementioned type, with which the temperature and the strain can be determined more easily and/or more precisely.

BRIEF SUMMARY OF THE INVENTION

This is achieved according to the invention by a device, having the features of claim 1 and by a method having the features of claim 11. The dependent claims recite preferred embodiments of the invention.

According to claim 1, the device, comprises:
- at least one laser light source configured to produce laser radiation,
- an optical fiber used for the measurement, into which the laser radiation can be coupled in and from which the Brillouin signals generated by the Brillouin scattering can be coupled out,
- sensor means configured to detect the coupled-out Brillouin signals,
- evaluation means configured to determine spatially resolved from the detected Brillouin signals the temperature and/or strain at least of sections of the optical fiber,
- at least one optical polarization beam splitter configured to split the coupled-out Brillouin signal's into two components having mutually different polarizations,
- at least one optical coupler (16, 17) configured to admix a laser radiation to the Brillouin signal.

It may be provided here that the sensor means can capture the two components separately. Particularly, in the device according to the invention, the Brillouin signal is split into two polarization components, which are thereafter each superimposed with a signal having a matching polarization and detected at two optical detectors. Thus, the entire signal is always measured without requiring averaging over measurements with different polarization. Admixing of laser radiation to the Brillouin signal improves the sensitivity of the device because the signal to be evaluated can be significantly amplified due to the admixing.

The device may include two optical couplers capable of admixing laser radiation to each of the two components of the of the Brillouin signal separated by the at least one optical polarization beam splitter.

The device may include a beam splitter capable of splitting off a portion of the laser radiation from the laser light source used for the excitation of the Brillouin scattering before coupling into the optical fiber used for the measurement, wherein this portion of the laser radiation can be admixed to the Brillouin signal.

Alternatively, the device may include a second laser light source capable of producing laser radiation which can be admixed to the Brillouin signal.

In particular, the second laser light source may have a frequency different from the first laser light source, in particular a frequency that is different by about 10 GHz. The device may have a beam splitter capable of splitting off a portion from the laser radiation from the laser light source used for the excitation of the Brillouin scattering before coupling into the optical fiber used for the measurement, wherein this portion may be used for tuning the second laser light source. In particular, the device may include an O-PLL, which stabilizes the difference frequency between the first and the second laser light source. Due to the aforementioned choice of the difference frequency, receivers with a cutoff frequency below 1 GHz can be used as optical detectors, which have a lower detection limit.

Alternatively, a Brillouin laser may be used as the second laser light source, as described in U.S. Pat. No. 7,283,216 B1. Here, too, the device may include a beam splitter capable of splitting off from the laser radiation from the laser light source used for the excitation of the Brillouin scattering before coupling into the optical, fiber used for the measurement, wherein this portion is used for optical pumping of the Brillouin laser whose Brillouin frequency is different from that of the measured Brillouin signal, Due to this frequency difference, the Brillouin laser can serve as an optical local oscillator (OLO).

The device may include components for measuring the Rayleigh scattering. The accuracy of the measuring device can be improved in this manner.

In particular, the components for the measurement of the Rayleigh scattering may include an additional laser light source that is different from the first laser light source, whereby the additional laser light source is preferably also different from an optionally present second laser light source for the generation of laser radiation to be admixed to the Brillouin signal. The additional laser light source can be used to intentionally stimulate the Rayleigh scattering.

The device may include as a reference an optical fiber serving or a section of the optical fiber used for the measurement serving as a reference, which is designed for example as a reference coil and generates a constant Brillouin signal at least over a predetermined length, so that this Brillouin signal can be detected with the sensor means and used to calibrate the sensitivity. Although the optical elements in the two receive channels may have a different sensitivity for whatever reasons, reliable measurement results can be obtained in this way.

The method according to claim 11 includes the following process steps:
- a laser radiation generated,
- for the measurement of temperature and strain, the laser radiation is coupled into an optical fiber,
- Brillouin signals generated by the laser radiation in the optical fiber are coupled out of the optical fiber,
- the coupled-out Brillouin signals are split into two components with mutually different polarizations,
- the two coupled-out components of the Brillouin signals are detected,
- evaluation means determine spatially resolved from the detected components of the Brillouin signals the temperature and/or strain at least of sections of the optical fiber.

The two components of the Brillouin signals that are coupled out ray be detected separately.

In particular, two output signals, which are suitably combined in particular before or after digitization, may be generated from the two detected components of the Brillouin signals, so as to obtain a polarization-independent output signal for determining the temperature and/or strain.

BRIEF DESCRIPTION OF THE DRAWINGS

Further features and advantages of the present invention will become apparent from the following description of preferred exemplary embodiments with reference to the accompanying drawings, wherein:

FIG. 3 shows a schematic diagram of a third embodiment of a device according to the invention.

DETAILED DESCRIPTION OF THE INVENTION

In the figures, identical or functionally identical parts are provided with identical reference symbols. The dashed connecting lines represent optical signals which are preferably guided in optical fibers. The solid connecting lines represent electrical signal lines.

Figure 1:
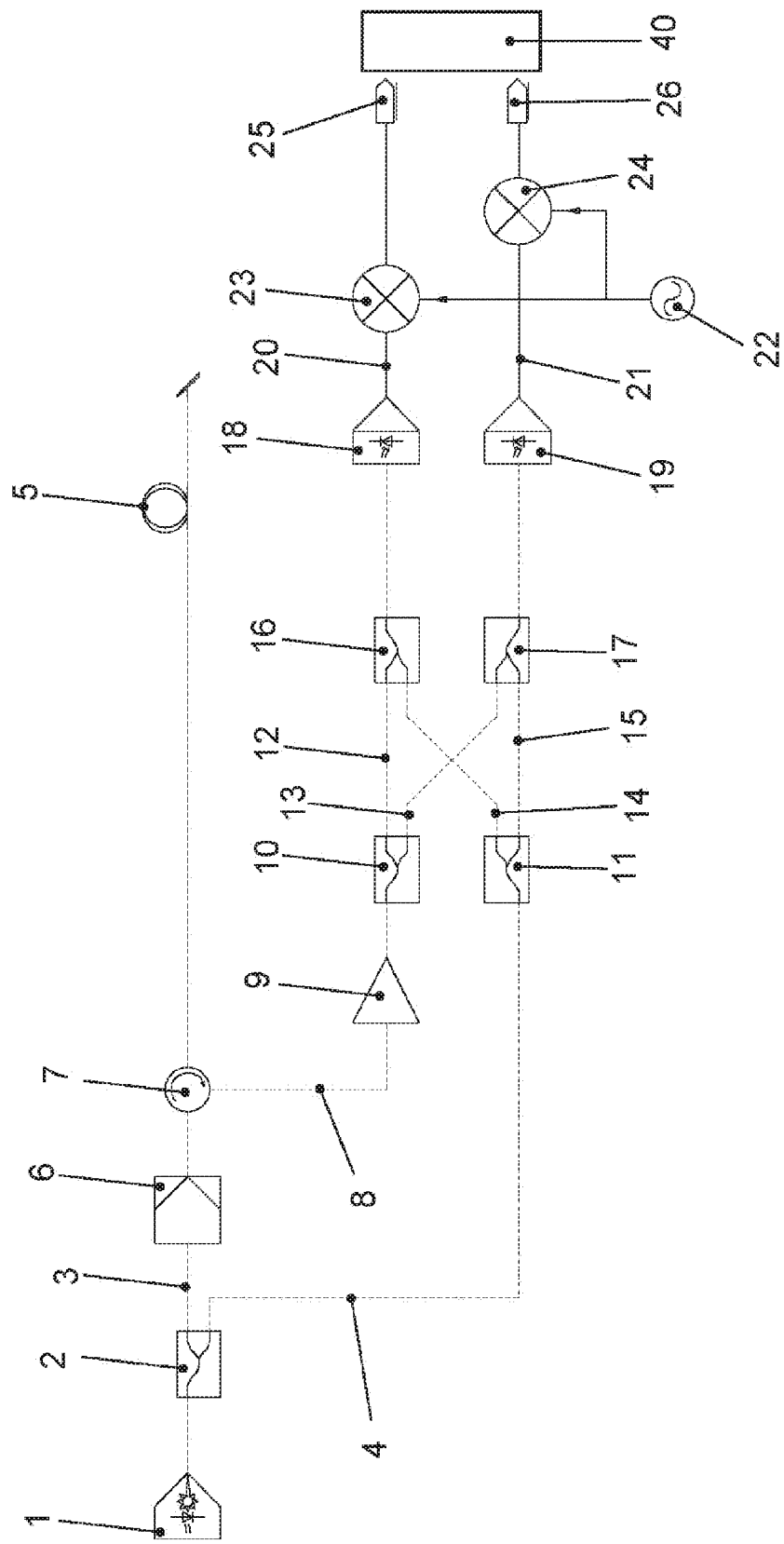
FIG. 1 shows a schematic diagram of a first embodiment of a device according to the invention.

In the device shown in FIG. 1, an optical superposition with the laser radiation used for the excitation of the Brillouin scattering is used.

The device according to the invention shown in FIG. 1 includes a laser light source 1 that emits narrow-band laser radiation, for example with a line width of 1 MHz. Furthermore, the laser radiation of the laser light source 1 has a constant power of for example several 10 mW. Preferably, frequency-stabilized diode lasers such as a distributed feedback (DFB) laser or other narrowband lasers with an emission wavelength in the near infrared region, for example at 1550 nm, are used as a laser light source 1.

The device shown in FIG. 1 furthermore includes a beam splitter 2 constructed as a fiber-optic splitter and configured to split the laser radiation from the laser light source 1 in two portions 3, 4. The first portion 3 is coupled into the optical fiber 5 used for the measurement, with which temperature and/or strain are to be determined spatially resolved by way of excitation of Brillouin scattering. The second portion 4 is used for superposition with a Brillouin signal that is generated by the Brillouin scattering and coupled out of the optical fiber 5, as will be described hereinafter in more detail.

The device further includes an optical modulator 6 configured to modulate the first portion 3 of the laser radiation according to the used method for the spatial association of the scattering signals. For example, when using a OTDR (optical time domain reflectometry) method, pulses or pulse trains may be formed from the first portion 3, whereas amplitude-modulated signals may be formed from the first portion 3 when using an OFDR (optical frequency domain reflectometry) method. An unillustrated optical amplifier may amplify the first portion 3 of the laser radiation used for the measurement, before the first portion 3 is introduced in the optical fiber 5 used for the measurement by way of an optical, in particular fiber-optic circulator 7, which is also part of the device.

Brillouin scattered signals are generated in the optical fiber 5 used for the measurement that are returned to the optical circulator 7 with a propagation delay of about 10 μs/km corresponding to the distance, from where they are guided by the receive path 8 of the device. An unillustrated optional optical filter, for example a fiber Bragg grating (FBG) may be used to suppress Rayleigh scattered light and thereby prevent interference with the measurement of the weaker Brillouin signal, Furthermore, optical amplification with an optional optical amplifier 9 can take place in the receive path 8.

Both the Brillouin signal and the second portion 4 of the laser radiation are split by optical, particularly fiber-optic polarization beam splitters 10, 11 into linearly polarized components 12, 13, 14, 15. Preferably, the second portion 4 of the laser radiation is coupled, especially with respect to its polarization direction, into the polarization beam splitter 11 at an angle of 45°, so as to form two orthogonally polarized components 14, 15 of substantially equal strength.

Instead of the polarization beam splitter 11 provided for splitting the second portion 4 of the laser radiation, a polarization-maintaining splitter (not shown) may also be used which splits the laser radiation with a 50:50 ratio.

The Brillouin signal from the optical fiber 5 used for the measurement exhibits very different polarization states depending on the propagation path through the fiber and thus also on the distance. The ratio of the two components 12, 13 is therefore not constant, but depends strongly on the distance.

Two optical, in particular fiber-optic, couplers 16, 17 are arranged downstream of the polarization beam splitters 10, 11, with of the couplers 16, 17 coupling a component 12, 13 of the Brillouin signal with a component 14, 15 of the second portion 4 of the laser radiation. The two components 14, 15 with different polarization of the second portion 4 of the laser radiation and the two components 12, 13 with different polarization of the Brillouin signal are combined in the fiber-optic couplers 16, 17 with the correct polarization.

In the event of an unbalanced detection, asymmetric couplers are preferably used, wherein a large portion of the Brillouin signal and a small portion of the second portion 4 of the laser beam are combined and supplied to the optical detectors 18, 19 which will be described in more detail below. This avoids an unnecessary weakening of the Brillouin signal. Such an asymmetric coupler may have a coupling ratio of, for example, 95:5, in particular a coupling ratio between 90:10 and 99:1. The asymmetric coupling ratios can prevent unintended signal losses, whereby a higher loss of the laser power admixed to the Brillouin signal is not critical, because this signal is significantly stronger.

A symmetrical coupling ratio is preferably used for a detection scheme with a balanced receiver diode.

The Brillouin signals and laser radiation portions combined with the, correct polarization are superimposed in the optical detectors 18, 19. In particular, a respective beat signal 20, 21 with the difference frequency between Brillouin signal and the laser radiation portion is produced in the range around 10 GHz. The frequency of this beat signal 20, 21 depends on the material of the optical fiber 5 used for the measurement, the temperature and the strain.

The power of the beat signals 20, 21 is proportional to the square root of the product of the powers of the Brillouin signal and laser radiation portion. A significantly stronger measurement signal is thus produced by using high laser powers than by a direct measurement of the Brillouin scattered light, thus significantly improving the sensitivity of the device is.

Each of the beat signals 20, 21 is mixed down with an electronic local oscillator 22 in a respective electronic mixer 23, 24 to a readily measurable frequency below 1 GHz. The output signals 25, 26 from these mixers 23, 24 for both polarizations are further amplified and digitized using digitizing device 40.

In particular, the first output signal 25 corresponds here to the horizontal; polarization and the second output signal 26 to the vertical polarization of the beat signals 20, 21 and the Brillouin signal, respectively. Before or after digitization, both output signals 25, 26 are suitably combined so as to obtain a polarization-independent output signal for determining the spatially dependent Brillouin parameters and ultimately the temperature or the strain.

For the well-defined and stable superposition of the desired polarization components, the optical fiber from the laser light source 1 via the polarization beam splitters 10, 11 to the optical fiber couplers 16, 17 and optionally also the optical fibers to the optical detectors 18, 19 are advantageously designed as polarization-maintaining fibers. Alternatively, single-mode fibers may advantageously also be used.

Figure 2:
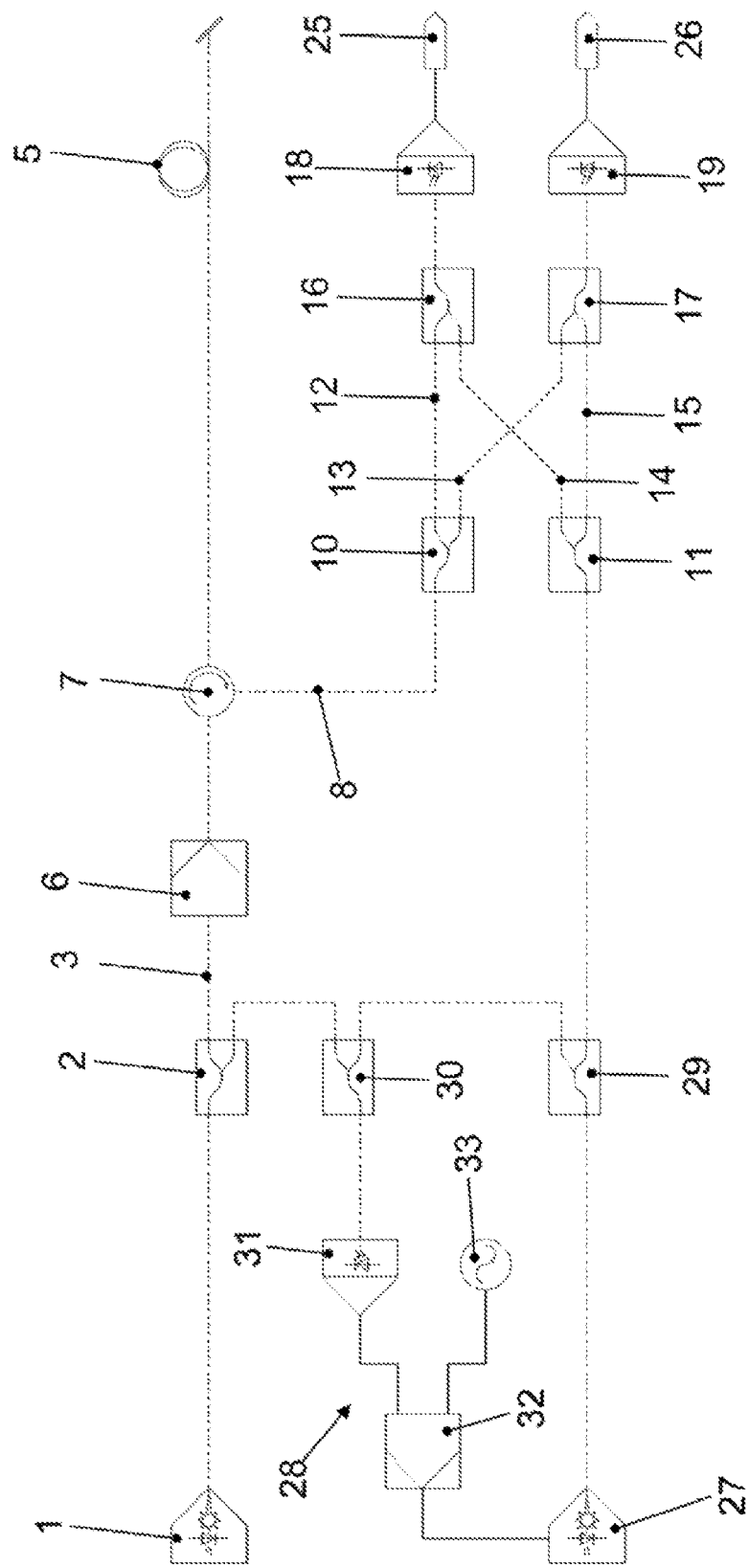
FIG. 2 shows a schematic diagram of a second embodiment of a device according to the invention.

In contrast to the device according to FIG. 1, the device of FIG. 2 has in addition to the first laser light source 1 a second narrow-band laser light source 27, the laser radiation of which is used for superposition with the Brillouin signal.

The frequency of the second laser light source 27 is hereby adjusted so that it is shifted with respect to the frequency of the first laser light source 1 so that the difference frequency between Brillouin scattered light and second laser light source 27 is below 1 GHz. For example, when using optical fibers made of quartz, a frequency shift of the two laser light sources 1, 27 with respect to each other of somewhat more than 10 GHz is required.

When the difference frequency is below 1 GHz, optical detectors 18, 19 with a cutoff frequency below 1 GHz can be used which have a lower detection limit. Moreover, amplification and filtering of the signals is easier and more efficient in this frequency range.

For the stabilization of the second laser light source 27 to the desired frequency separation from the first laser light source 1, a phase-locked loop with an optical input signal is used, subsequently referred to as O-PLL (optical phase locked loop) 28. A portion of the laser radiation from both laser light sources 1, 27 is split off by a beam splitter 2, 29 formed as a fiber-optic splitter, is combined with the correct polarization via a fiber-optic coupler 30 and is then superposed on an optical detector 31. The measured signal contains a portion at the difference frequency of both laser light sources, which should be in the range around 10 GHz. The frequency of the signal is compared in a phase-locked loop, subsequently referred to as a PLL circuit 32, to the frequency of an electronic local oscillator 33 which was adjusted to the desired difference frequency. The frequency of one of the two laser light sources 1, 27 is adjusted on the basis of the comparison signal such that the difference frequency of the laser light sources 1, 27 will match that of the local oscillator 33. When diode lasers are used, the laser frequency is preferably adjusted via the operating current.

The device according to FIG. 3 differs from that according to FIG. 2 by additional components for measuring the Rayleigh scattering.

If the Rayleigh scattering were excited with the same narrow-band laser as the Brillouin scattering, then a back-scattered signal would be generated with an amplitude that would strongly vary due to the Coherent Rayleigh Noise (CRN). Such a signal is not suitable as a reference for calculating the Landau-Placzek ratio.

The CRN may be eliminated by averaging several measurements with the narrow-band laser light source at different wavelengths.

FIG. 3 shows a variant, in which an additional, in particular a third laser light source 34 is provided for exciting the Rayleigh scattering. This additional laser light source 34 may be a broadband laser with a half-width of, for example, several nm. It should be noted at this point that the laser radiation from the additional laser light source 34 is thus considerably more broad-band than the radiation emanating from the first laser light source 1.

A possibility exists to switch, for exciting the Brillouin and Rayleigh scattering, between the first and the additional laser light source 1, 34 by using an optical switch 35, or to combine the laser radiations via an unillustrated fiber-optic coupler, and to then switch on the laser light sources 1, 34 as required.

The laser light source 34 provided for exciting the Rayleigh scattering can be directly pulsed, pulse-coded or modulated. Alternatively, the desired time profile of the amplitude may also be generated with an optical modulator.

The Brillouin signal may be separated from the Rayleigh signal with an optical filter 36, such as a fiber Bragg grating (FBG), wherein the Rayleigh signal may be received, filtered and amplified by an additional optical detector 37. The obtained output signal 38 is then digitized and digitally processed.

In the embodiment according to FIG. 3, two optical circulators 7 are provided, each with three connections. Instead of two optical circulators, only one optical circulator with four connections may be used.

In the event that the optical elements, photo receiver and amplifier in the two receive channels downstream of the polarization beam splatters 10, 11 result in a different sensitivity, a section of the measuring path may be implemented as a reference coil 39. This is depicted in FIG. 3 as an example. Such a reference coil 39 may, of course, also be provided in the embodiments shown in FIG. 1 and/or FIG. 2. On the other hand, the reference coil 39 may also be omitted in the embodiment of FIG. 3.

A certain length of optical fiber, such as 100 meters, is installed in the reference coil 39 so that the entire fiber length generates the same Brillouin signal. In particular, the fiber should have a constant temperature and a constant strain, in particular no strain. The Brillouin signal from the reference coil 39 can then be measured with both receive channels and be used to calibrate the sensitivity of the receive channels.

Assuming that the signal from the reference coil 39 is equally strong in both polarizations, the receive channels are then calibrated so as to measure together equally strong signals for the reference coil. The adjusted equal sensitivity of the receive channels is advantageous for an optimum combination of the two received signals.

Instead of embodiments depicted in FIG. 1 to FIG. 3 with two optical detectors 18, 19 for the separate detection of the two components 12, 13, combined optical detectors (not shown) for the components 12, 13 may also be provided. For example, two photodiodes may be provided on a single chip or in a housing, or only two areas may be provided on a photodiode. The two photocurrents generated by these photodiodes or in these separate areas may be connected in parallel so that only their sum is amplified and digitized.

The advantage of such a configuration is a better signal-to-noise ratio of the analog signal. A possibility should be provided for this variant to calibrate the optical signal so that both signals are received with equal strength. This can be accomplished, for example, by way of a variable optical attenuator in one of the receive paths, which is controlled based on characteristics of the measurement signal.

LIST OF REFERENCE NUMBERS 1, 27, 34 laser light source
2, 29 beam spatter
3 first portion of the laser radiation
4 second portion of the laser radiation
5 optical fiber used for the measurement
6 optical modulator
7 optical circulator
8 receive path
9 optical input amplifier
10, 11 optical polarization beam splitter
12, 13, 14, 15 linearly polarized components
16, 17, 30 optical coupler
18, 19, 31, 37 optical detector
21, 21 beat signal
22, 33 electronic local oscillator (LO)
23, 24 electronic mixer
25, 26, 38 output signal
28 O-PLL 32 PLL circuit
35 optical switch
36 optical filter ⇔reference fiber

The invention claimed is:

1. A device for spatially resolved measurement of temperature, strain or both by Brillouin scattering, comprising:
   one laser light source (1) configured to produce laser radiation,
   an optical fiber (5) used for the measurement, into which the laser radiation is coupled in and from which Brillouin signals generated based on the Brillouin scattering are coupled out,
   optical detectors (18, 19) configured to capture the coupled-out Brillouin signals,
   a digitizing device configured to determine the spatially resolved measurements of temperature, strain, or both of at least sections of the optical fiber (5) from the captured Brillouin signals,
   at least one optical polarization beam splitter (10, 11) configured to split the coupled-out Brillouin signals into two components (12, 13) with mutually different polarizations,
   at least one optical coupler (16, 17) configured to admix to the Brillouin signal the laser radiation.

2. The device according to claim 1, wherein the optical detectors (18, 19) detect the two components (12, 13) separate from each other.

3. The device according to claim 1, wherein the device comprises two optical couplers (16, 17), each configured to admix the laser radiation to each of the two components (12, 13) of the Brillouin signal separated by the at least one optical polarization beam splitter (10, 11).

4. The device according to claim 1, further comprising a beam splitter (2) configured to split off a portion (4) from the laser radiation of the laser light source (1) used for exciting the Brillouin scattering prior to coupling into the optical fiber used for the measurement, wherein the split off portion (4) of the laser radiation is admixed to the Brillouin signal.

5. The device according to claim 1, further comprising components for measuring Rayleigh scattering.

6. The device according to claim 5, wherein the components for measuring the Rayleigh scattering comprise a third laser light source (34) having a frequency that is different from the first laser light source (1).

7. The device according to claim 6, wherein the frequency of the third laser light source (34) is also different from a frequency of a second laser light source (27) for the generation of the laser radiation to be admixed to the Brillouin signal.

8. The device according to claim 1, further comprising a reference coil (39) generating a constant Brillouin signal at least over a predetermined length, the constant Brillouin signal is detected with the optical detectors (18, 19) and used to calibrate sensitivity, wherein the reference coil (39) is a section of the optical fiber (5) used for the measurement or another optical fiber.

9. A device for spatially resolved measurement of temperature strain or both by Brillouin scattering, comprising:
   a first laser light source (1) configured to produce laser radiation,
   an optical fiber (5) used for the measurement, into which the laser radiation is coupled in and from which Brillouin signals generated based on the Brillouin scattering are coupled out,
   a second laser light source (27) producing the laser radiation admixed to the Brillouin signal,
   optical detectors (18, 19) configured to capture the coupled-out Brillouin signals,
   a digitizing device configured to determine the spatially resolved measurements of temperature, strain, or both of at least sections of the optical fiber (5) from the captured Brillouin signals,
   at least one optical polarization beam splitter (10, 11) configured to split the coupled-out Brillouin signals into two components (12, 13) with mutually different polarizations,
   at least one optical coupler (16, 17) configured to admix to the Brillouin signal the laser radiation.

10. The device according to claim 9, wherein the second laser light source (27) has a frequency different from the first laser light source (1).

11. The device according to claim 10, further comprising an Optical Phase Locked Loop (28), which stabilizes the different frequency between the first and the second laser light sources (1, 27).

12. The device according to claim 9, wherein the second laser light source (27) has a frequency different from the first laser light source (1) by about 10 GHz.

13. A method for spatially resolved measurement of temperature, strain or both by Brillouin scattering, comprising the following steps:
   generating a laser radiation,
   coupling for the measurement of temperature, strain or both, the laser radiation into an optical fiber (5),
   coupling out of the optical fiber (5) Brillouin signals generated in the optical fiber (5) by the laser radiation,
   splitting the coupled-out Brillouin signals into two components (12, 13) having mutually different polarizations,
   detecting the two components (12, 13) of the coupled-out Brillouin signals,
   digitizing and determining the spatially resolved measurement of temperature, strain or both at least of sections of the optical fiber (5) from the detected components (12, 13) of the Brillouin signals.

14. The method according to claim 13, wherein the step of detecting the two components (12, 13) of the coupled-out Brillouin signals are detected separately from each other.

15. The method according to claim 13, further comprising the step of generating two output signals (25, 26) from the detected two components (12, 13) of the Brillouin signals, which are then combined to obtain a polarization-independent output signal for determining the spatially resolved measurement of temperature, strain or both.

16. The method according to claim 15, wherein the two generated output signals (25, 26) are combined before or after the digitization to obtain a polarization-independent output signal for determining the spatially resolved measurement of temperature, strain or both.

* * * * *